US010562361B2

(12) United States Patent
Chang

(10) Patent No.: US 10,562,361 B2
(45) Date of Patent: Feb. 18, 2020

(54) TUBELESS AIR VALVE SYSTEM

(71) Applicant: RIM MASTER INDUSTRIAL CO., LTD, Tainan (TW)

(72) Inventor: I-Huang Chang, Tainan (TW)

(73) Assignee: RIM MASTER INDUSTRIAL CO., LTD., Tainan (TW)

( * ) Notice: Subject to any disclaimer, the term of this patent is extended or adjusted under 35 U.S.C. 154(b) by 125 days.

(21) Appl. No.: 15/984,072

(22) Filed: May 18, 2018

(65) Prior Publication Data
US 2019/0263201 A1    Aug. 29, 2019

(30) Foreign Application Priority Data
Feb. 26, 2017    (TW) .............................. 107202633 U

(51) Int. Cl.
| | |
|---|---|
| *B60C 29/00* | (2006.01) |
| *B60C 29/02* | (2006.01) |
| *B60C 29/06* | (2006.01) |
| *B60C 19/12* | (2006.01) |

(52) U.S. Cl.
CPC .......... *B60C 29/005* (2013.01); *B60C 29/002* (2013.01); *B60C 29/02* (2013.01); *B60C 29/062* (2013.01); *B60C 19/12* (2013.01); *Y10T 137/3584* (2015.04)

(58) Field of Classification Search
CPC . Y10T 137/3584; B60C 29/005; B60C 29/02; B60C 29/002; B60C 29/062
See application file for complete search history.

(56) References Cited

U.S. PATENT DOCUMENTS

| | | | |
|---|---|---|---|
| 8,967,182 B2* | 3/2015 | Tigges | B60C 29/02 137/223 |
| 9,539,870 B2* | 1/2017 | Deanesi | B60C 29/007 |
| 2018/0370305 A1* | 12/2018 | Krefting | B60C 29/002 |

* cited by examiner

*Primary Examiner* — Kevin L Lee
(74) *Attorney, Agent, or Firm* — Pai Patent & Trademark Law Firm; Chao-Chang David Pai

(57) ABSTRACT

A tubeless air valve stem has a body, an airtight element, and a sleeve. The body has a passage, a through hole, and at least one side hole. The passage is formed on a top end of the body. The through hole is formed through a bottom end of the body and is in communication with the passage. The at least one side hole is formed through an outer surface of the body and is in communication with the passage. The airtight element is disposed around the body. The sleeve is disposed around the body for closing the at least one side hole. Gas or liquid can be injected into a tubeless tire via the at least one side hole. The intake efficiency of the tubeless air valve stem can be maintained and is not influenced by the remaining reinforcing agent.

20 Claims, 13 Drawing Sheets

TUBELESS AIR VALVE SYSTEM

This application claims the benefit of Taiwan patent application No. 107202633, filed on Feb. 26, 2018, the entire contents of which are incorporated herein by reference.

BACKGROUND OF THE INVENTION

1. Field of the Invention

The present invention relates to a tubeless air valve stem, and more particularly to a tubeless air valve stem for keeping the intake efficiency of the tubeless air valve stem.

2. Description of Related Art

A tubeless tire is applied to a vehicle, such as a bike. For preventing deflation when the tubeless tire is damaged, reinforcing agents such as sealant liquid or anti-puncture liquid may be injected into the tubeless tire via a conventional air valve stem by a user. The reinforcing agent covers an inner surface of a cover of the tubeless tire for reinforcing the cover of the tubeless tire. When the tubeless tire is damaged, the reinforcing agent can be permeated into a broken site of the tubeless tire for decreasing a deflation degree of the tubeless tire.

With reference to FIG. 13, the conventional air valve stem has a body 90 and an airtight element 80 mounted around and covered on a bottom end of the body 90. A through hole 70 is formed through the body 90 and the airtight element 80. The reinforcing agent is injected into the tubeless tire via the through hole 70 of the conventional air valve stem. The reinforcing agent has the viscosity and a surface tension. Part of the reinforcing agent may remain on a bottom end of an inner surface of the conventional air valve stem.

However, the conventional air valve stem has the single through hole 70. Viscosities of the reinforcing agents by various manufacturers are different. When the viscosity of the reinforcing agent is large, the reinforcing agent is easy to remain on the bottom end of the inner surface of the conventional air valve stem. A caliber of a distal end of the through hole 70 is reduced. Gas quantity of the conventional air valve stem is reduced, too. Moreover, the through hole 70 is blocked by the remaining reinforcing agent. Gas cannot be injected into the tubeless tire via the conventional air valve stem.

To overcome the shortcomings, the present invention provides a tubeless air valve stem to mitigate or obviate the aforementioned problems.

SUMMARY OF THE INVENTION

The objective of the invention is to provide a tubeless air valve stem that can solve the problem that the reinforcing agent remains on the bottom end of the inner surface of the conventional air valve stem to decrease the gas quantity of the conventional air valve stem.

The tubeless air valve stem has a body, an airtight element, and a sleeve. The body has a top end, a bottom end, an outer surface, a threaded portion, a connecting portion, a bypassing portion, a passage, a through hole, and at least one side hole. The threaded portion is formed on the outer surface of the body and is connected to the top end of the body. The connecting portion is formed on the outer surface of the body below the threaded portion. The bypassing portion is formed on the outer surface of the body below the connecting portion, is connected to the bottom end of the body, and has an outer surface. The passage is formed on the top end of the body and extends to the bypassing portion. The through hole is formed through the bottom end of the body, extends toward the top end of the body, and is in communication with the passage. The at least one side hole is formed through the outer surface of the bypassing portion and is in communication with the passage. The airtight element is disposed around the connecting portion of the body. The sleeve is an elastic component and is disposed around the bypassing portion of the body for closing the at least one side hole.

The tubeless air valve stem is disposed on a wheel rim of a tubeless tire for connecting a gas supply device for injection. Reinforcing agent can be injected into the tubeless tire via the tubeless air valve stem. When a pressure generated by liquid or gas passing through the tubeless air valve stem is larger than a contraction force of the sleeve, the liquid or the gas in the tubeless air valve stem may flow into the tubeless tire via the at least one side hole. Even though the through hole is blocked by the remaining reinforcing agent, the liquid or the gas in the tubeless air valve stem can flow into the tubeless tire via the at least one side hole. Gas quantity of the tubeless air valve stem is not influenced.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
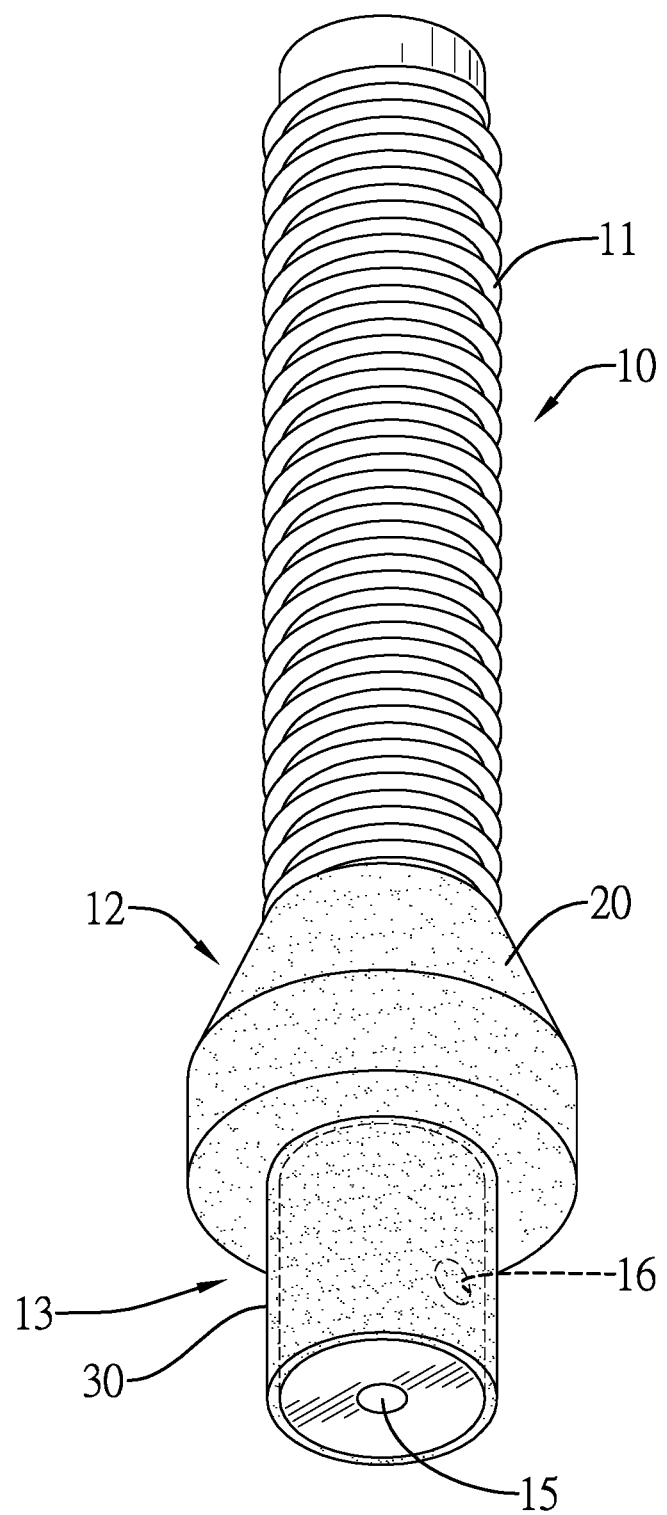
FIG. 1 is a perspective view of a first embodiment of a tubeless air valve stem in accordance with the present invention.
Figure 2:
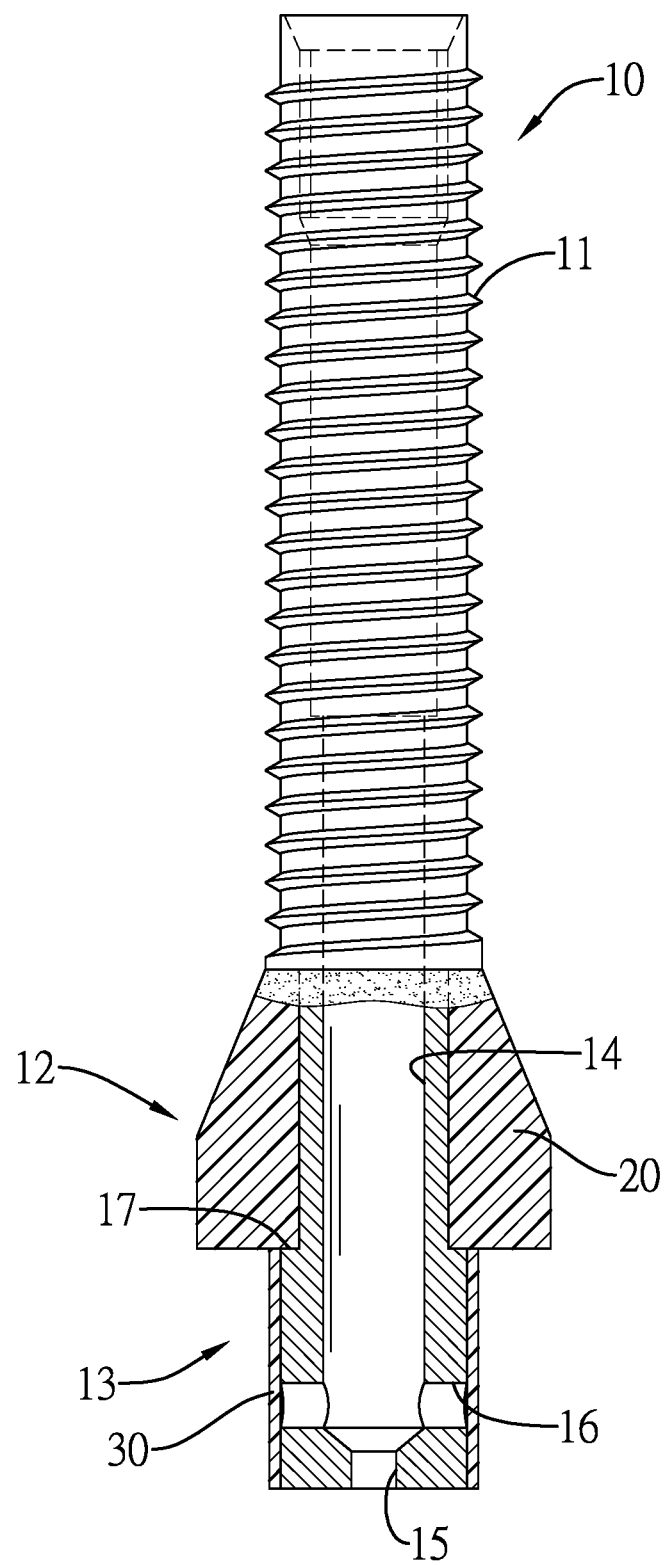
FIG. 2 is a side view in partial section of the tubeless air valve stem in FIG. 1.

With reference to FIGS. 1 to 10, many embodiments of a tubeless air valve stem in accordance with the present invention are disclosed, but it is not limited thereto. Structures of the tubeless air valve stem shown in FIGS. 1 and 2 are basic. Structural modifications of the tubeless air valve stem shown in FIGS. 3 to 10 are based on the basic structure of the tubeless air valve stem shown in FIGS. 1 and 2.

With reference to FIGS. 1 and 2, a first embodiment of the tubeless air valve stem in accordance with the present invention comprises a body 10, an airtight element 20, and a sleeve 30.

With reference to FIGS. 1 and 2, the body 10 has a top end, a bottom end, an outer surface, a threaded portion 11, a connecting portion 12, a bypassing portion 13, a passage 14, a through hole 15, and at least one side hole 16. The threaded portion 11 is formed on the outer surface of the body 10 and is connected to the top end of the body 10. The connecting portion 12 is formed on the outer surface of the body 10 below the threaded portion 11. The bypassing portion 13 is formed on the outer surface of the body 10 below the connecting portion 12, is connected to the bottom end of the body 10, and has an outer surface. The passage 14 is formed through the top end of the body 10 and extends to the bypassing portion 13. The through hole 15 is formed through the bottom end of the body 10, extends toward the top end of the body 10, and is in communication with the passage 14. The at least one side hole 16 is formed through the outer surface of the bypassing portion 13 and is in communication with the passage 14. Furthermore, the body 10 has a connecting groove 17. The connecting groove 17 is formed on an outer surface of the connecting portion 12.

The airtight element 20 is disposed around the connecting portion 12 of the body 10. Furthermore, the airtight element 20 is disposed in and is limited by the connecting groove 17. The airtight element 20 and the body 10 are independent components. Alternatively, the airtight element 20 is made of rubber and is formed on the body 10 by vulcanization. Alternatively, the airtight element 20 is made of the plastic material and is formed on the body 10.

The sleeve 30 is an elastic component and is disposed around the bypassing portion 13 of the body 10 for closing the at least one side hole 16.

Figure 10:
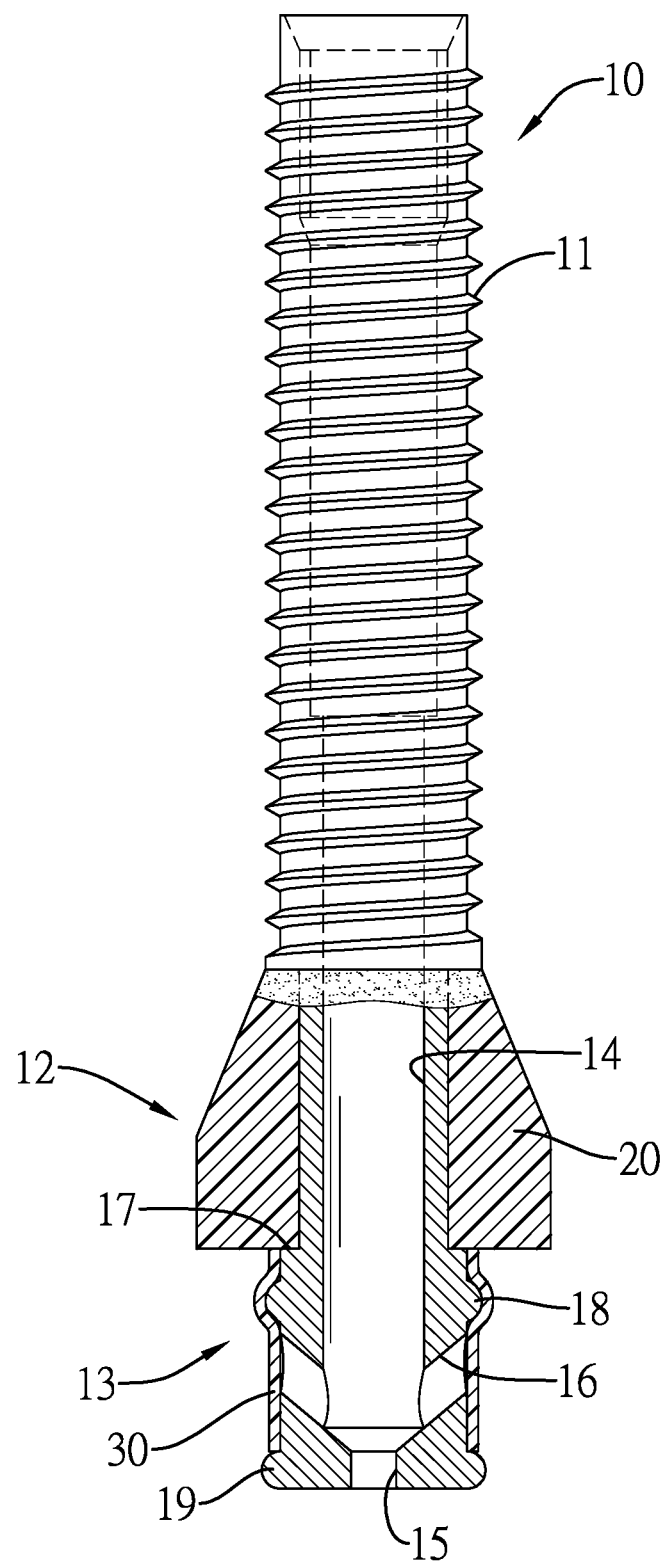
FIG. 10 is a side view in partial section of a sixth embodiment of a tubeless air valve stem in accordance with the present invention.

With reference to FIGS. 1 and 2, in the first embodiment of the tubeless air valve stem, the at least one side hole 16 horizontally extends toward and is in communication with the passage 14. With reference to FIG. 10, in the second embodiment to the sixth embodiment of the tubeless air valve stem, the at least one side hole 16 is oblique. The at least one side hole 16 is obliquely and downwardly extends toward and is in communication with the passage 14.

With reference to FIGS. 1 and 2, the bypassing portion 13 of the body 10 is a cylindrical rod. The sleeve 30 downwardly extends to the bottom end of the body 10.

Figure 3:
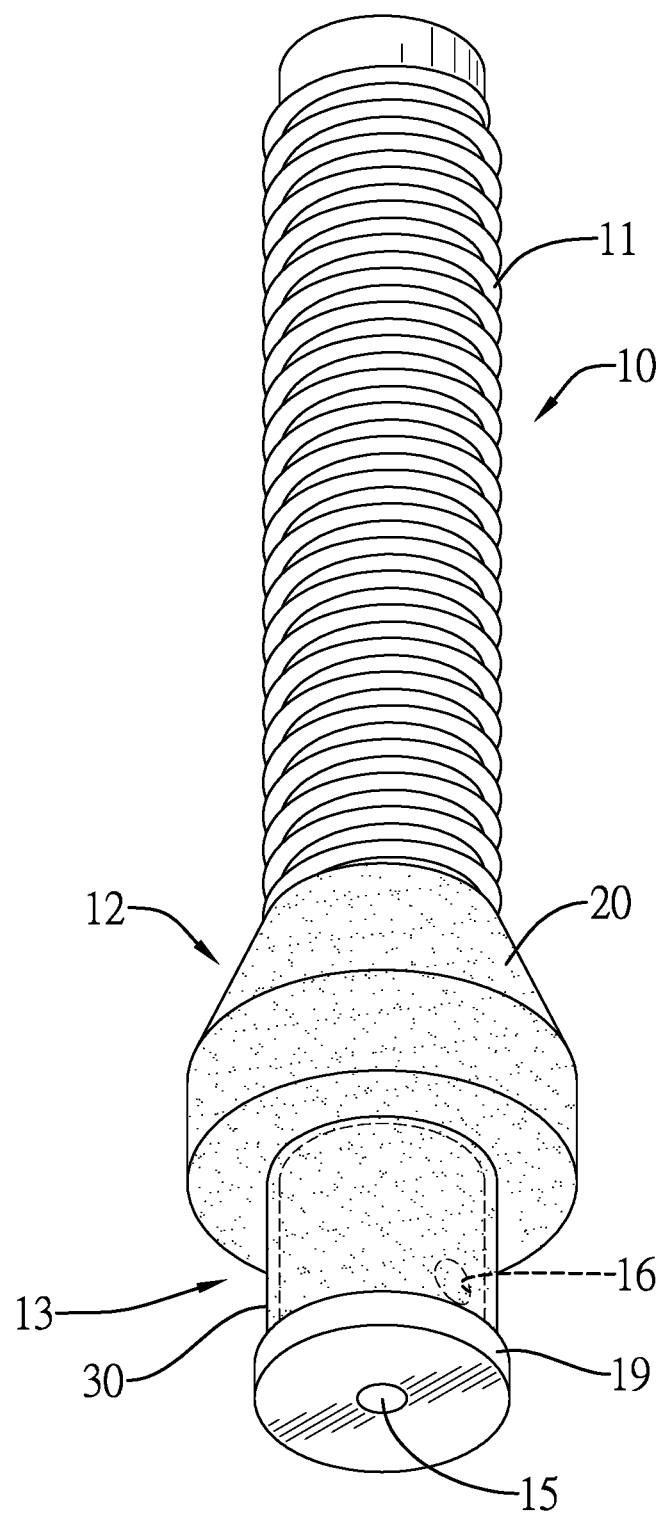
FIG. 3 is a perspective view of a second embodiment of a tubeless air valve stem in accordance with the present invention.
Figure 4:
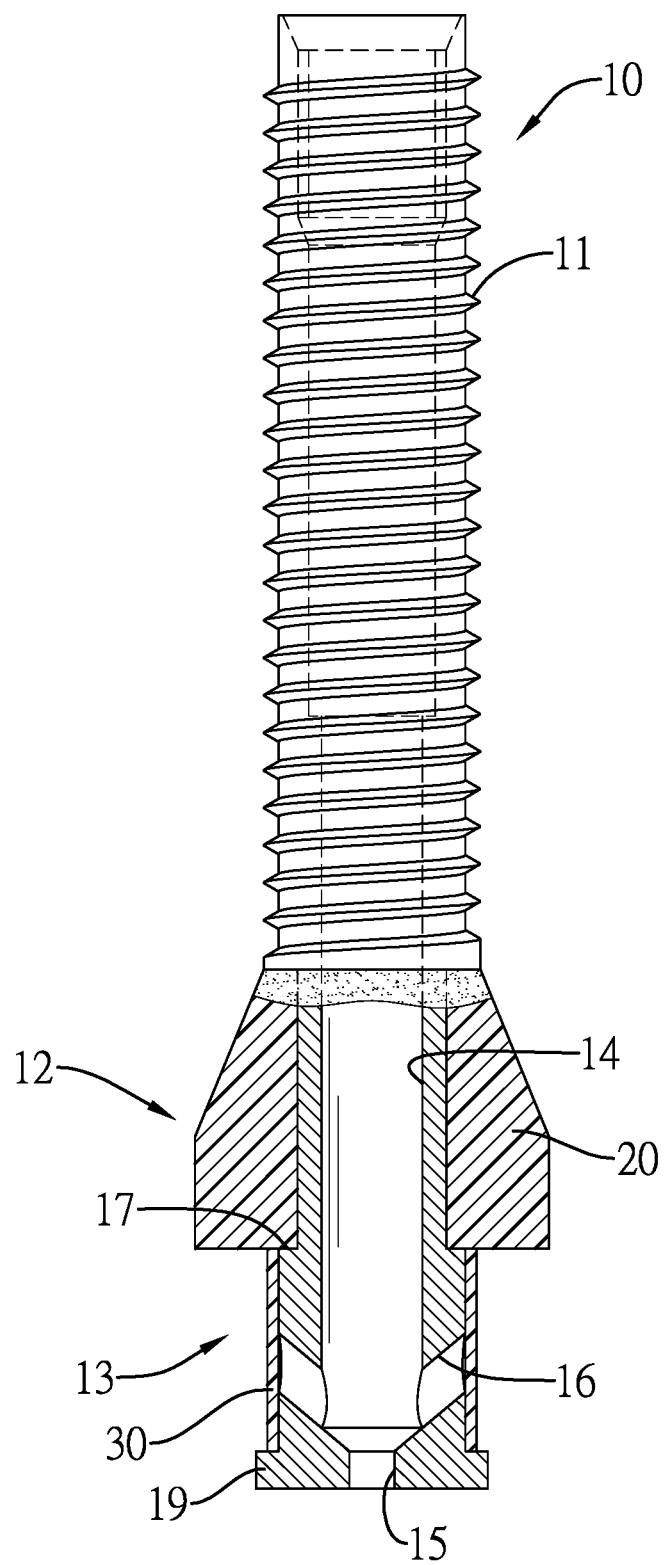
FIG. 4 is a side view in partial section of the tubeless air valve stem in FIG. 3.

With reference to FIGS. 3 and 4, in the second embodiment of the tubeless air valve stem, the body 10 has a flange 19. The flange 19 is formed on and is protruded from a bottom end of the bypassing portion 13. A bottom end of the sleeve 30 abuts the flange 19. A longitudinal cross section of the flange 19 may be square or arced in shape.

Figure 5:
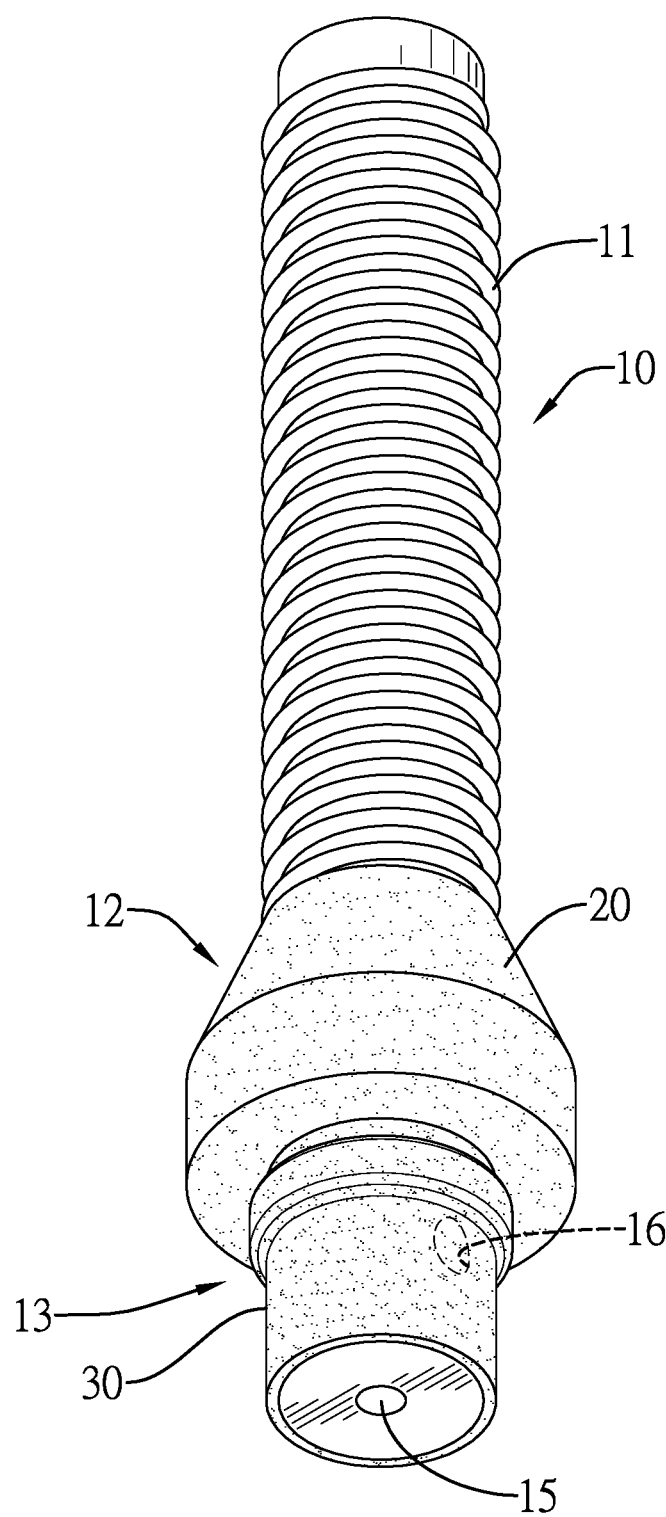
FIG. 5 is a perspective view of a third embodiment of a tubeless air valve stem in accordance with the present invention.
Figure 6:
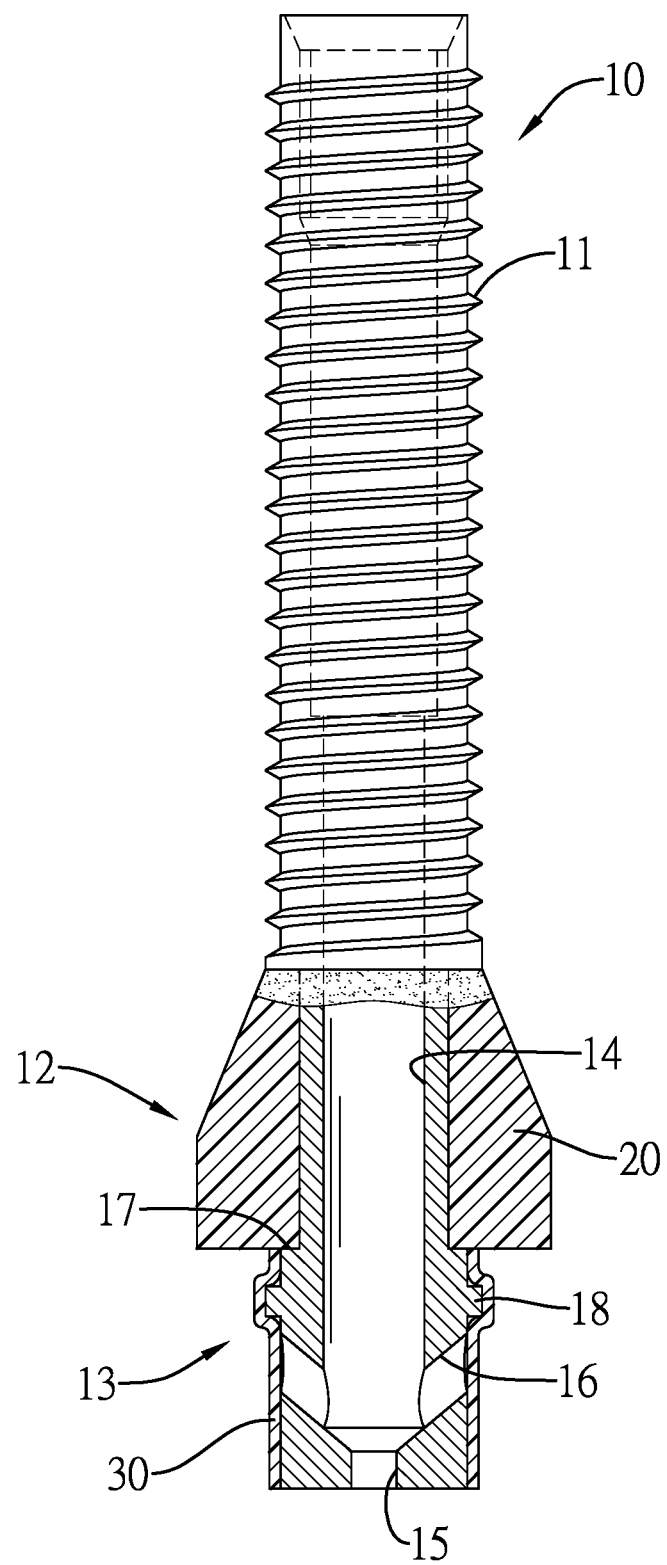
FIG. 6 is a side view in partial section of the tubeless air valve stem in FIG. 5.

With reference to FIGS. 5 and 6, in the third embodiment, the body 10 has a slip-proof protrusion 18. The slip-proof protrusion 18 is formed on and protrudes from the outer surface of the bypassing portion 13. The sleeve 30 covers and engages with the slip-proof protrusion 18. A longitudinal cross section of the slip-proof protrusion 18 may be square or arced in shape.

With reference to FIGS. 7 to 10, in the fourth embodiment, the fifth embodiment, and the sixth embodiment of the tubeless air valve stem, the body 10 has a flange 19. The flange 19 is formed on and is protruded from a bottom end of the bypassing portion 13. The body 10 has a slip-proof protrusion 18. The slip-proof protrusion 18 is formed on and is protruded from an outer surface of the bypassing portion 13. The sleeve 30 covers and engages with the slip-proof protrusion 18. A bottom end of the sleeve 30 abuts the flange 19. A longitudinal cross section of the flange 19 is square or arched in shape, but it is not limited thereto. A longitudinal cross section of the slip-proof protrusion 18 is square or arced in shape, but it is not limited thereto.

With reference to FIG. 10, the sleeve 30 can be limited by the slip-proof protrusion 18 and/or the flange 19 to avoid sliding or departing from the bypassing portion 13.

Figure 7:
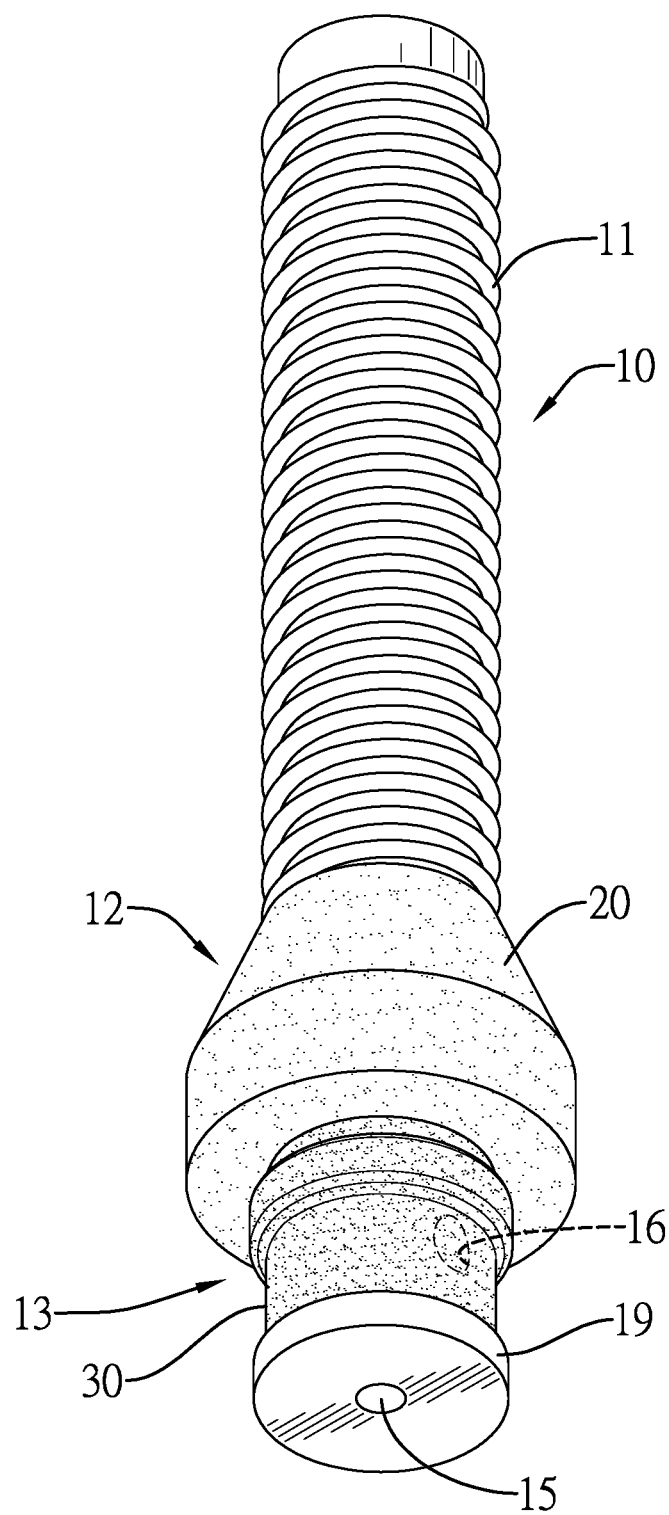
FIG. 7 is a perspective view of a fourth embodiment of a tubeless air valve stem in accordance with the present invention.
Figure 8:
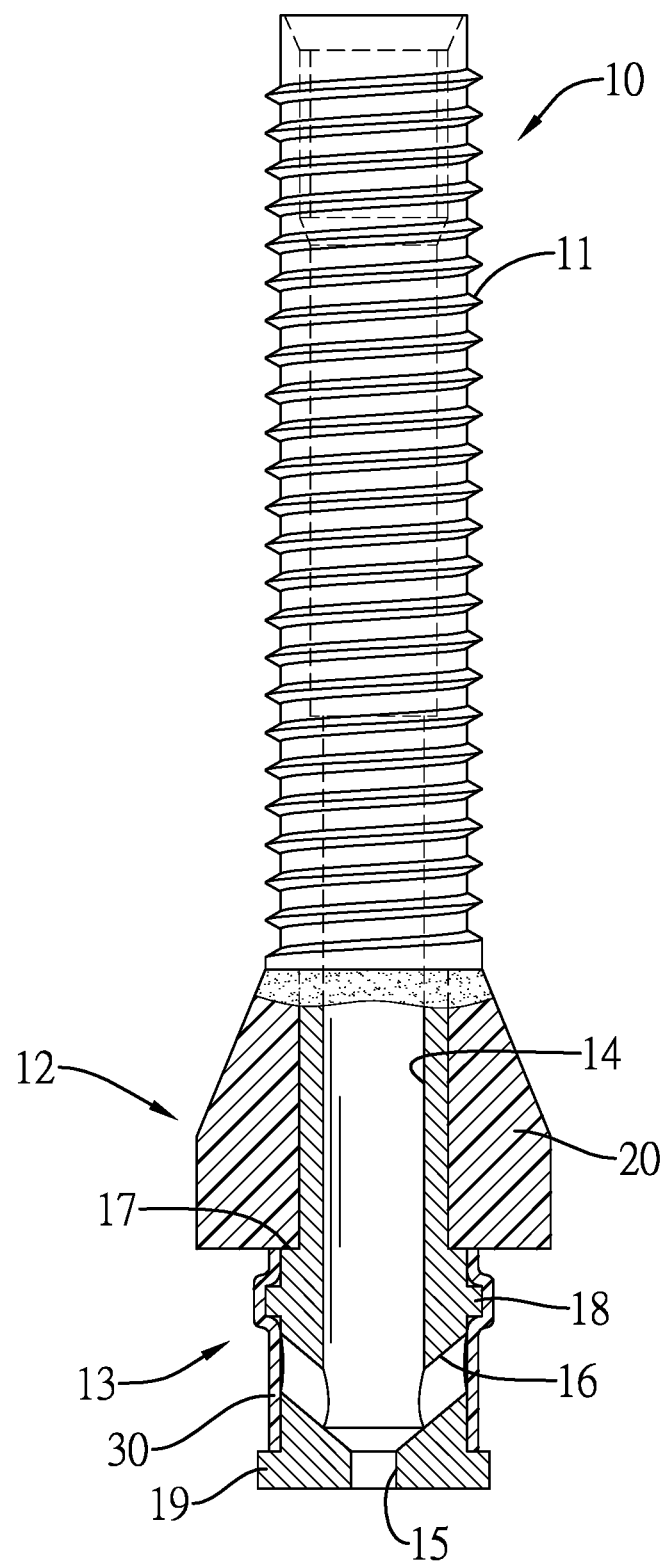
FIG. 8 is a side view in partial section of the tubeless air valve stem in FIG. 7.
Figure 9:
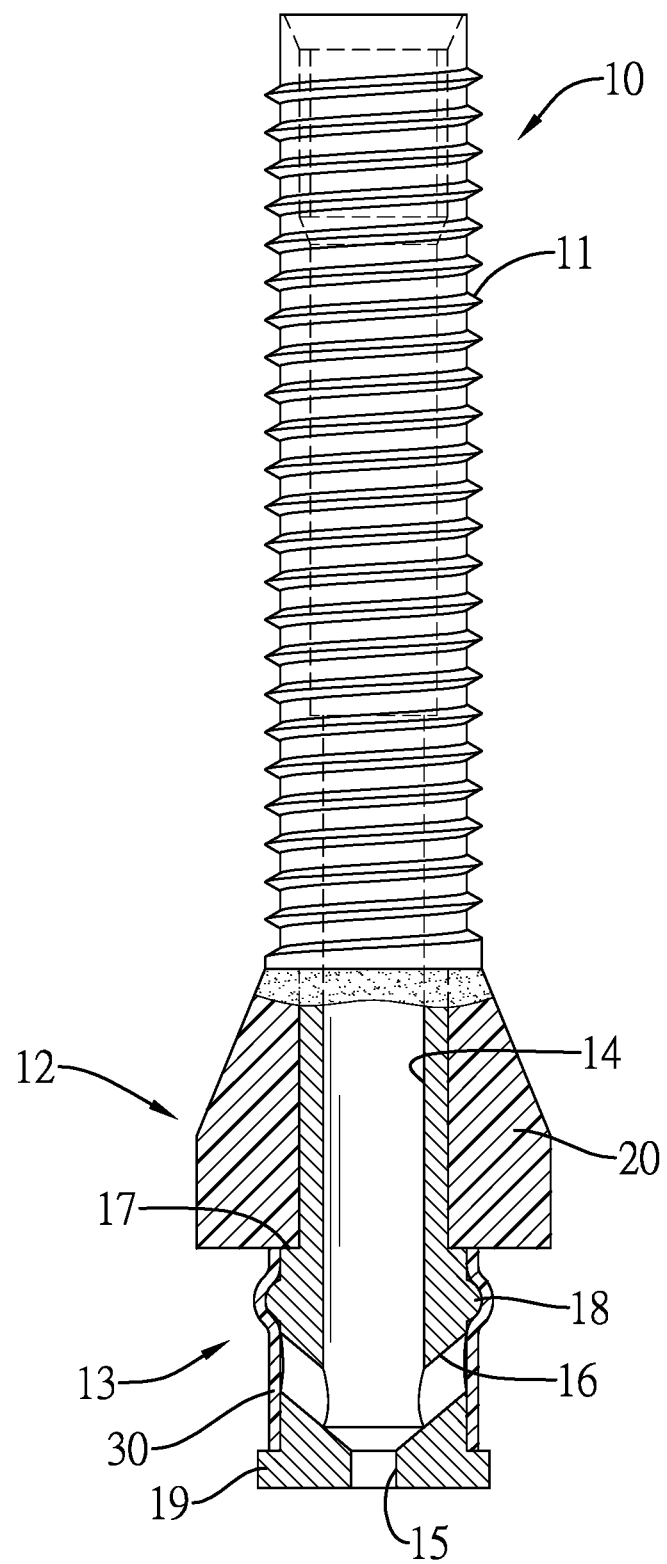
FIG. 9 is a side view in partial section of a fifth embodiment of a tubeless air valve stem in accordance with the present invention.
Figure 11:
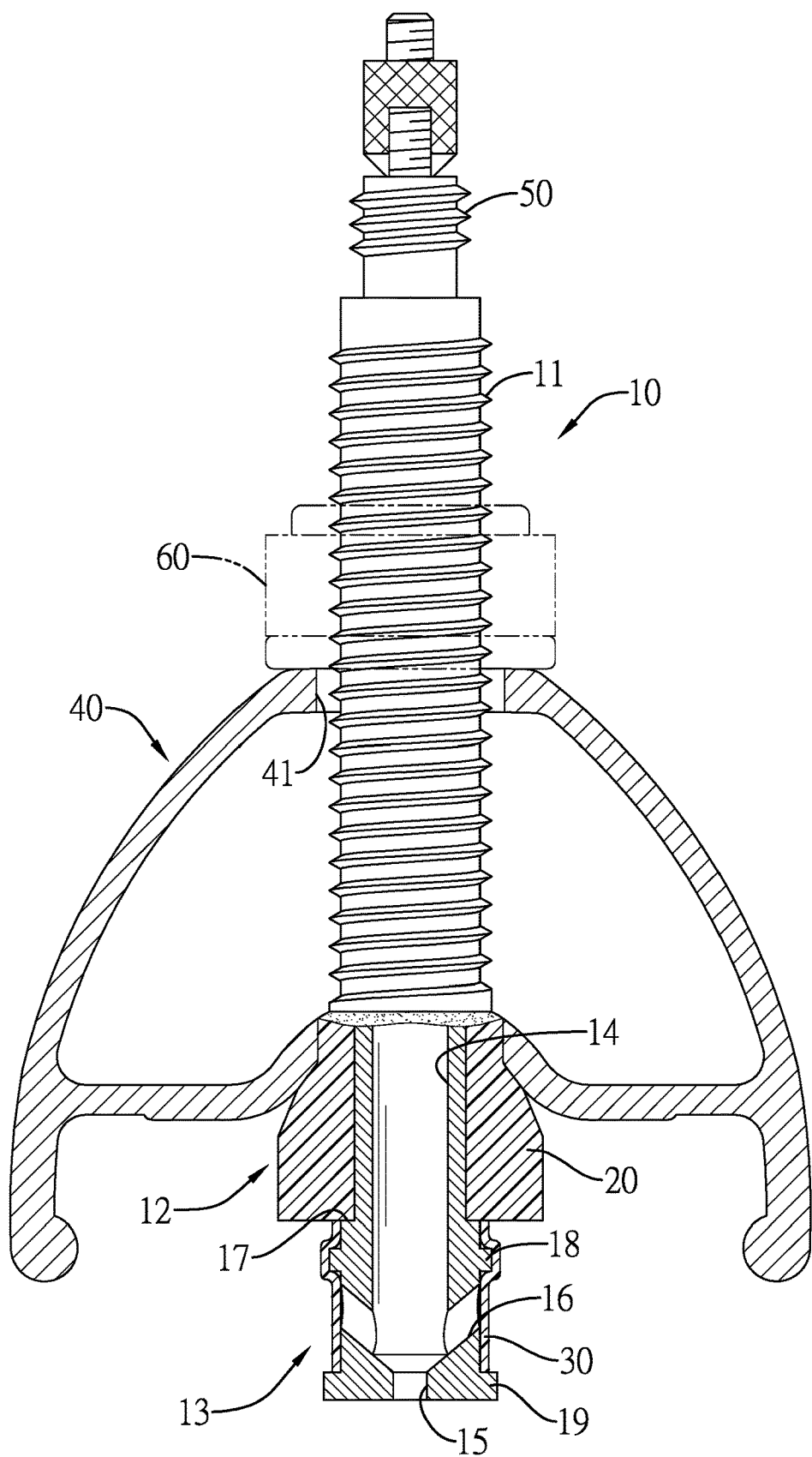
FIG. 11 is an operational side view in partial section of the tubeless air valve stem in FIG. 8, showing the tubeless air valve stem is disposed on a wheel rim.
Figure 12:
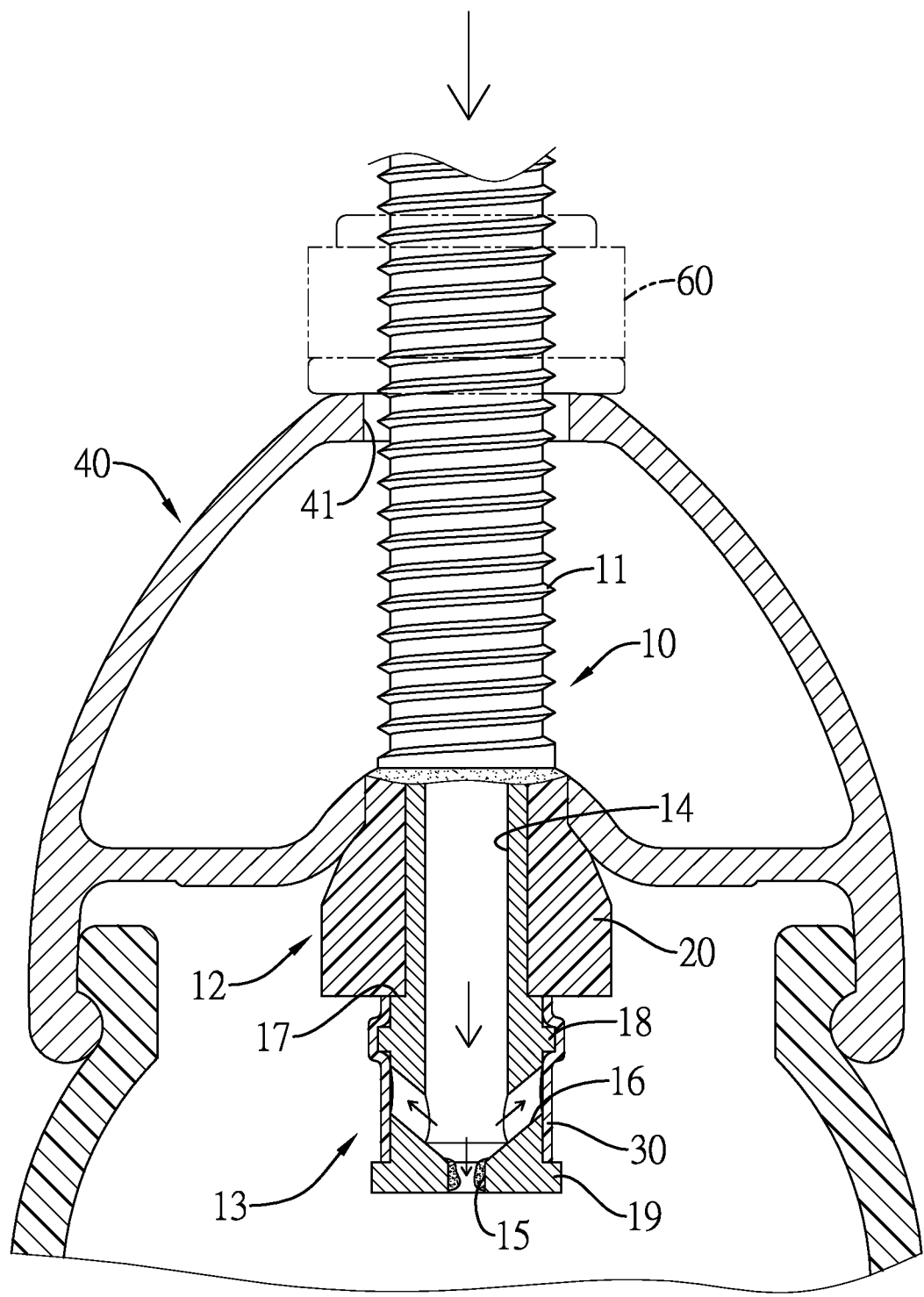
FIG. 12 is another operational side view in partial section of the tubeless air valve stem in FIG. 8, showing reinforcing agent is injected into a tire, and then the tire is inflated.
Figure 13:
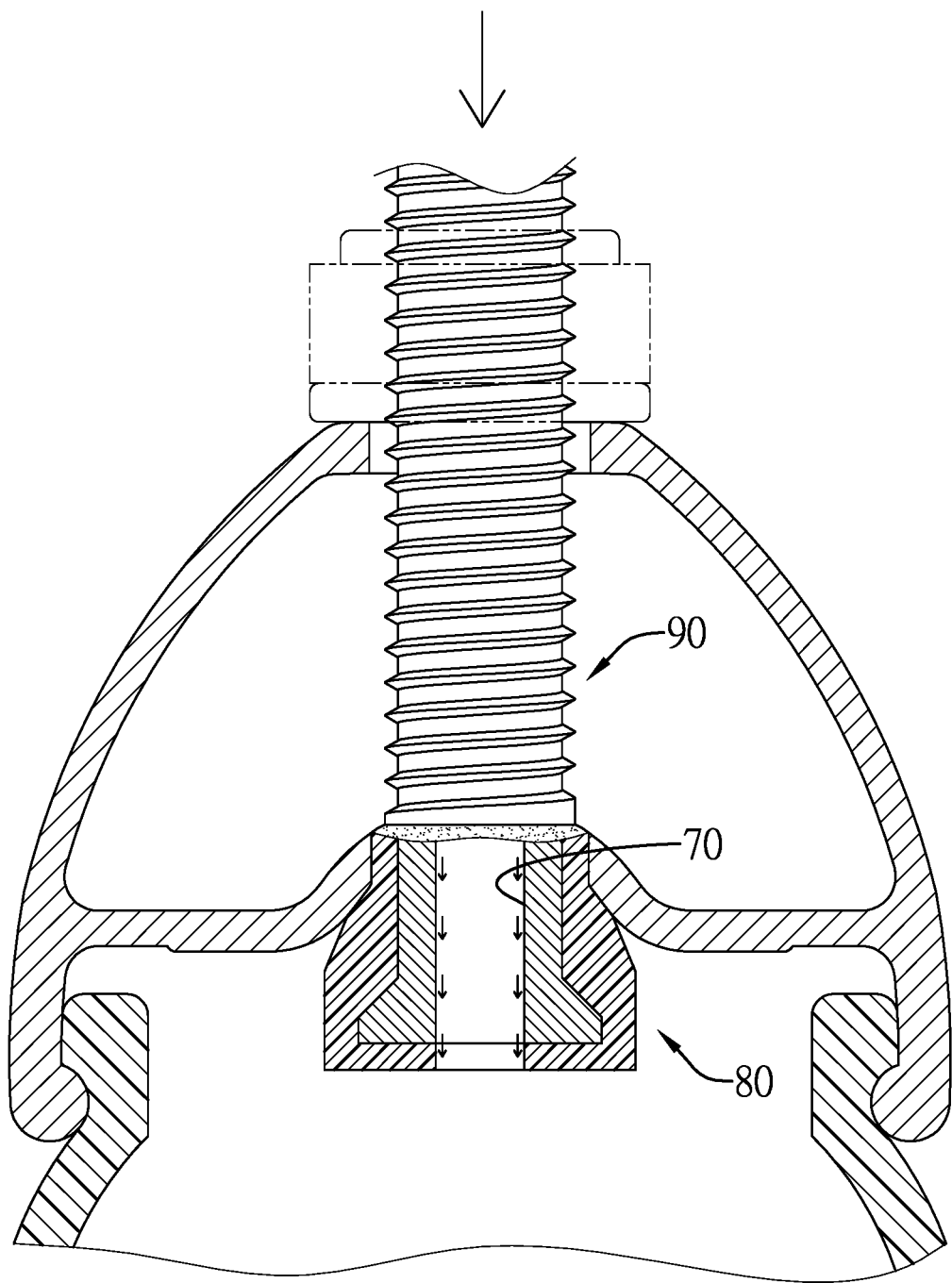
FIG. 13 is an operational side view in partial section of an air valve stem in accordance with the prior art, showing the air valve stem is disposed on a tubeless tire and reinforcing agent is injected into the tubeless tire.

With reference to FIGS. 11 and 12, in the operation of the fourth embodiment of the tubeless air valve stem, the tubeless air valve stem is disposed on a wheel rim 40 of a tubeless tire. The body 10 is inserted into a perforating hole 41 of the wheel rim 40. The airtight element 20 abuts the wheel rim 40. A nut 60 is screwed on the threaded portion 11 of the body 10 and abuts the wheel rim 40. The wheel rim 40 abuts the airtight element 20 by the nut 60 for increasing an airtight effect. An air core assembly 50 can be disposed on the body 10 of the tubeless air valve stem and is applied to be connected to a gas supply device for injection. With reference to FIG. 7, after the air core assembly 50 is detached from the body 10, reinforcing agent can be injected into the tubeless tire by the tubeless air valve stem for increasing an inner strength of a cover of the tubeless tire.

Before the reinforcing agent is injected into the tubeless tire, the air core assembly 50 is detached from the tubeless air valve stem by a user. The reinforcing agent is injected into the passage 14 of the body 10 and flows out of the through hole 15 of the body 10. When the injection of the reinforcing agent is finished, the air core assembly 50 is re-disposed on the body 10 of the tubeless air valve stem. With reference to FIG. 12, the reinforcing agent remains in the through hole 15 and a caliber of the through hole 15 is decreased by the remaining reinforcing agent. Thus, gas supplied by the gas supply device is injected into the tubeless tire, and the gas flows into the passage 14 and a pressure of the gas in the passage 14 is increased. The sleeve 30 may be pushed by the increased pressure of the gas for opening the at least one side hole 16. The gas in the passage 14 can flow into the tubeless tire via the at least one side hole 16 for decreasing the influence of the remaining reinforcing agent on gas quantity of the tubeless air valve stem.

Accordingly, in the tubeless air valve stem, the at least one side hole 16 is closed or opened by the sleeve 30. When gas or liquid is injected into the tubeless tire, the gas or the liquid can flow into the tubeless tire via the at least one side hole 16 opened by the sleeve 30. The influence of the remaining reinforcing agent on gas quantity of the tubeless air valve stem is avoided. The intake efficiency of the tubeless air valve stem can be maintained and is not influenced by the remaining reinforcing agent.

What is claimed is:

1. A tubeless air valve stem comprising:
    a body having
        a top end;

a bottom end;

an outer surface;

a threaded portion formed on the outer surface of the body and connected to the top end of the body;

a connecting portion formed on the outer surface of the body below the threaded portion;

a bypassing portion formed on the outer surface of the body below the connecting portion, connected to the bottom end of the body, and having an outer surface;

a passage formed through the top end of the body and extending to the bypassing portion;

a through hole formed through the bottom end of the body, extending toward the top end of the body, and communicating with the passage; and at least one side hole formed through the outer surface of the bypassing portion and communicating with the passage;

an airtight element disposed around the connecting portion of the body; and a sleeve being an elastic component and disposed around the bypassing portion of the body for closing the at least one side hole.

2. The tubeless air valve stem as claimed in claim 1, wherein the at least one side hole horizontally extends toward and is in communication with the passage.

3. The tubeless air valve stem as claimed in claim 1, wherein the at least one side hole obliquely and downwardly extends toward and is in communication with the passage.

4. The tubeless air valve stem as claimed in claim 1, wherein the bypassing portion of the body is a cylindrical rod, and the sleeve downwardly extends to the bottom end of the body.

5. The tubeless air valve stem as claimed in claim 2, wherein the bypassing portion of the body is a cylindrical rod, and the sleeve downwardly extends to the bottom end of the body.

6. The tubeless air valve stem as claimed in claim 3, wherein the bypassing portion of the body is a cylindrical rod, and the sleeve downwardly extends to the bottom end of the body.

7. The tubeless air valve stem as claimed in claim 1, wherein the body has a flange, the flange is formed on and is protruded from a bottom end of the bypassing portion, and a bottom end of the sleeve abuts the flange.

8. The tubeless air valve stem as claimed in claim 2, wherein the body has a flange, the flange is formed on and is protruded from a bottom end of the bypassing portion, and a bottom end of the sleeve abuts the flange.

9. The tubeless air valve stem as claimed in claim 7, wherein a longitudinal cross section of the flange is square or arced in shape.

10. The tubeless air valve stem as claimed in claim 8, wherein a longitudinal cross section of the flange is square or arced in shape.

11. The tubeless air valve stem as claimed in claim 1, wherein the body has a slip-proof protrusion, the slip-proof protrusion is formed on and protrudes from the outer surface of the bypassing portion, and the sleeve covers and engages with the slip-proof protrusion.

12. The tubeless air valve stem as claimed in claim 2, wherein the body has a slip-proof protrusion, the slip-proof protrusion is formed on and protrudes from the outer surface of the bypassing portion, and the sleeve covers and engages with the slip-proof protrusion.

13. The tubeless air valve stem as claimed in claim 11, wherein a longitudinal cross section of the slip-proof protrusion is square or arced in shape.

14. The tubeless air valve stem as claimed in claim 1, wherein the body has a flange, the flange is formed on and is protruded from a bottom end of the bypassing portion, a bottom end of the sleeve abuts the flange, the body has a slip-proof protrusion, the slip-proof protrusion is formed on and protrudes from the outer surface of the bypassing portion, and the sleeve covers and engages with the slip-proof protrusion.

15. The tubeless air valve stem as claimed in claim 2, wherein the body has a flange, the flange is formed on and is protruded from a bottom end of the bypassing portion, a bottom end of the sleeve abuts the flange, the body has a slip-proof protrusion, the slip-proof protrusion is formed on and protrudes from the outer surface of the bypassing portion, and the sleeve covers and engages with the slip-proof protrusion.

16. The tubeless air valve stem as claimed in claim 14, wherein a longitudinal cross section of the flange is square or arced in shape, and a longitudinal cross section of the slip-proof protrusion is square or arced in shape.

17. The tubeless air valve stem as claimed in claim 1, wherein the body has a connecting groove, the connecting groove is formed on an outer surface of the connecting portion, and the airtight element is disposed in the connecting groove.

18. The tubeless air valve stem as claimed in claim 2, wherein the body has a connecting groove, the connecting groove is formed on an outer surface of the connecting portion, and the airtight element is disposed in the connecting groove.

19. The tubeless air valve stem as claimed in claim 11, wherein the body has a connecting groove, the connecting groove is formed on an outer surface of the connecting portion, and the airtight element is disposed in the connecting groove.

20. The tubeless air valve stem as claimed in claim 12, wherein the body has a connecting groove, the connecting groove is formed on an outer surface of the connecting portion, and the airtight element is disposed in the connecting groove.

* * * * *

UNITED STATES PATENT AND TRADEMARK OFFICE
CERTIFICATE OF CORRECTION

PATENT NO.       : 10,562,361 B2
APPLICATION NO.  : 15/984072
DATED            : February 18, 2020
INVENTOR(S)      : I-Huang Chang Page 1 of 1

It is certified that error appears in the above-identified patent and that said Letters Patent is hereby corrected as shown below:

On the Title Page

Item (54), and in the Specification, Column 1 Line 1 the title of invention "TUBELESS AIR VALVE SYSTEM" should read --TUBELESS AIR VALVE STEM--.

Signed and Sealed this
Fifth Day of May, 2020

Andrei Iancu
*Director of the United States Patent and Trademark Office*